(12) United States Patent
Shinya et al.

(10) Patent No.: US 10,866,532 B2
(45) Date of Patent: Dec. 15, 2020

(54) ELECTROSTATIC CHARGE IMAGE DEVELOPING TONER, ELECTROSTATIC CHARGE IMAGE DEVELOPER, AND TONER CARTRIDGE

(71) Applicant: FUJI XEROX CO., LTD., Tokyo (JP)

(72) Inventors: Tomohiro Shinya, Minamiashigara (JP); Naomi Miyamoto, Minamiashigara (JP); Tomohito Nakajima, Minamiashigara (JP); Shinya Nakashima, Minamiashigara (JP); Shinya Sakamoto, Minamiashigara (JP); Masaki Iwase, Minamiashigara (JP); Ryutaro Kembo, Minamiashigara (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 16/531,212

(22) Filed: Aug. 5, 2019

(65) Prior Publication Data

US 2020/0310269 A1 Oct. 1, 2020

(30) Foreign Application Priority Data

Mar. 26, 2019 (JP) ................. 2019-057796

(51) Int. Cl.
*G03G 9/08* (2006.01)
*G03G 9/087* (2006.01)
*G03G 15/08* (2006.01)
*C08F 210/02* (2006.01)

(52) U.S. Cl.
CPC ....... *G03G 9/08704* (2013.01); *C08F 210/02* (2013.01); *G03G 9/08755* (2013.01); *G03G 15/0865* (2013.01)

(58) Field of Classification Search
CPC .................. G03G 9/08704; G03G 9/08755
USPC .............................. 430/109.3, 109.4, 109.1
See application file for complete search history.

(56) References Cited

U.S. PATENT DOCUMENTS 7,005,224 B2 * 2/2006 Hohner .............. G03G 9/08704
430/108.4
2017/0315462 A1 11/2017 Chimoto et al.

FOREIGN PATENT DOCUMENTS

| JP | 2000-98664 A | 4/2000 |
| JP | 2010-151899 A | 7/2010 |
| JP | 2017-201398 A | 11/2017 |

* cited by examiner

*Primary Examiner* — Mark A Chapman
(74) *Attorney, Agent, or Firm* — Sughrue Mion, PLLC (57) ABSTRACT

An electrostatic charge image developing toner includes a polar group-containing olefin resin that is a polymer of a composition containing at least one nonpolar monomer unit (X) selected from the group consisting of ethylene and α-olefin having 3 to 10 carbon atoms, a polar monomer unit (Y) having at least one of a maleic acid group and a maleic anhydride group, and a monomer unit (Z) having a polymerizability to at least one of the nonpolar monomer unit (X) and the polar monomer unit (Y), in which an acid value of the toner is 10 mgKOH/g to 60 mgKOH/g.

9 Claims, 2 Drawing Sheets

ELECTROSTATIC CHARGE IMAGE DEVELOPING TONER, ELECTROSTATIC CHARGE IMAGE DEVELOPER, AND TONER CARTRIDGE

CROSS-REFERENCE TO RELATED APPLICATIONS

This application is based on and claims a priority under 35 USC 119 from Japanese Patent Application No. 2019-057796 filed on Mar. 26, 2019.

BACKGROUND

Technical Field

The present invention relates to an electrostatic charge image developing toner, an electrostatic charge image developer, and a toner cartridge.

Related Art

In the image forming apparatus, a toner image formed on an image holding member is transferred to a surface of a recording medium, and then the toner image is fixed on the recording medium by a fixing member which is heated and pressed in contact with the toner image to form an image.

As toner used for such an image forming apparatus, for example, JP-A-2017-201398 discloses "toner having a toner particle containing a resin component, in which the resin component contains an ester group-containing olefin copolymer and an acid group-containing olefin copolymer, the ester group-containing olefin copolymer has a unit Y1 of a specific structure, and at least one unit Y2 selected from a unit of a specific structure and the group consisting of the unit of the specific structure, an acid value of the ester group-containing olefin copolymer is 10 mgKOH/g or less, an acid value of the acid group-containing olefin copolymer is 50 mgKOH/g to 300 mgKOH/g, the content of the ester group-containing olefin copolymer in the resin component is 50% by weight or more with respect to the total mass of the resin component, the content of the unit Y2 in the ester group-containing olefin copolymer is 3% by weight to 35% by weight with respect to the total mass of the ester group-containing olefin copolymer".

Further, JP-A-2010-151899 discloses "an electrostatic charge image developing toner that contains a binder resin (A) containing at least an alicyclic olefin resin or a polyester resin, an α-olefin copolymer resin (B) intermolecularly ion-bonded by a metal ion, and a coloring agent".

Further, JP-A-2000-98664 discloses "an electrophotographic toner that contains a copolymer containing, as monomer components, at least an alpha olefin monomer unit A for forming a specific structure and at least one monomer unit B selected from vinyl monomers having a carboxyl group or an acid anhydride group, and a polyolefin resin having an ionic crosslinked structure obtained by the reaction with a metal compound capable of ionic crosslinking with the carboxyl group or acid anhydride group".

SUMMARY

In recent years, image formation on various recording media, for example, recording media such as adhesive paper, film synthetic paper, and labels that are considered to be susceptible to heat is required. However, in a case of fixing a toner image to a recording medium that is considered to be susceptible to heat, it is required to lower the fixing temperature at the time of fixing, and thereby it is difficult to obtain high image strength. As a result, the obtained image may be inferior in bending resistance.

Aspects of certain non-limiting embodiments of the present disclosure relate to an electrostatic charge image developing toner that is excellent in bending resistance in an image to be formed as compared with a case of only containing an olefin resin which is a polymer of a composition containing only two of at least one nonpolar monomer unit (X) selected from the group consisting of ethylene and α-olefin having 3 to 10 carbon atoms, a polar monomer unit (Y) having at least one of a maleic acid group and a maleic anhydride group, and a monomer unit (Z) having a polymerizability to at least one of the nonpolar monomer unit (X) and the polar monomer unit (Y), or a case where an acid value of the toner is less than 10 mgKOH/g.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an electrostatic charge image developing toner containing a polar group-containing olefin resin which is a polymer of a composition containing at least one nonpolar monomer unit (X) selected from the group consisting of ethylene and α-olefin having 3 to 10 carbon atoms, a polar monomer unit (Y) having at least one of a maleic acid group and a maleic anhydride group, and a monomer unit (Z) having a polymerizability to at least one of the nonpolar monomer unit (X) and the polar monomer unit (Y), in which an acid value of the toner is 10 mgKOH/g to 60 mgKOH/g.

BRIEF DESCRIPTION OF THE DRAWINGS

Exemplary embodiment(s) of the present invention will be described in detail based on the following figures, wherein.

DETAILED DESCRIPTION

Hereinafter, the exemplary embodiment of the invention will be described.

Electrostatic Charge Image Developing Toner

An electrostatic charge image developing toner (hereinafter, referred to as "toner") according to the exemplary embodiment contains a polar group-containing olefin resin which is a polymer of a composition containing the following nonpolar monomer unit (X), polar monomer unit (Y), and monomer unit (Z).

At least one nonpolar monomer unit (X) selected from the group consisting of ethylene and α-olefin having 3 to 10 carbon atoms Polar monomer unit (Y) having at least one of a maleic acid group and a maleic anhydride group Monomer unit (Z) having a polymerizability to at least one of the nonpolar monomer unit (X) and the polar monomer unit (Y)

The acid value of the toner is 10 mgKOH/g to 60 mgKOH/g.

Note that, as the monomer unit (Z), a monomer having a chemical structure different from that of the nonpolar monomer unit (X) and the polar monomer unit (Y) is used.

The toner according to the exemplary embodiment has the above configuration, and thus is excellent in the bending resistance in an image to be formed. The reason is presumed as follows.

In recent years, with the expansion of the printing market, the demand for image formation on various recording media (for example, recording media such as adhesive paper, film synthetic paper, and labels that are considered to be susceptible to heat) as well as image formation on plain paper and coated paper generally performed in the related art has been increasing. However, in order to realize the image formability on various recording media, the fixability in a wide temperature range (so-called fixing latitude) is required, and for example, in a case where the toner image is fixed to the recording medium which is considered to be susceptible to heat, it is required to lower the fixing temperature at the time of fixing, and thus it is difficult to obtain high image strength. As a result, the obtained image may be inferior in bending resistance.

In contrast, the toner according to the exemplary embodiment contains a polar group-containing olefin resin which is a polymer of a composition containing a nonpolar monomer unit (X), a polar monomer unit (Y), and a monomer unit (Z) having a chemical structure different from that of the nonpolar monomer unit (X) and the polar monomer unit (Y). As described above, by containing the resin in which at least three monomer units (X), (Y) and (Z) are polymerized, the fixability in a wide temperature range (so-called fixing latitude) is enhanced. For this reason, in a case where the toner image is fixed to the recording medium which is considered to be susceptible to heat, that is, even in a case where it is required to lower the fixing temperature at the time of fixing, the image strength in a fixed image is enhanced, and the bending resistance is excellent.

In addition, the polar group-containing olefin resin has at least one of a maleic acid group and a maleic anhydride group. These maleic acid group and maleic anhydride group have at least two carboxy groups in one each group, and thus in the polymer chain of the polar group-containing olefin resin, two carboxy groups are present adjacent to each other. A hydrophilic polar group such as a carboxy group interacts with the recording medium to contribute to the adhesion to the recording medium. Therefore, by the presence of two adjacent carboxy groups in the polymer chain, the adjacent carboxy groups interact with the recording medium to be firmly fixed, and thereby the image strength in the fixed image is enhanced, and the bending resistance of the image is enhanced.

In the toner according to the exemplary embodiment, the acid value of the toner is 60 mgKOH/g or less. That is, the toner contains a large amount of acid groups, and these acid groups interact with the recording medium to contribute to the adhesion to the recording medium. Therefore, the image strength in the fixed image is enhanced, and the bending resistance of the image is enhanced.

As described above, according to the toner according to the exemplary embodiment, the bending resistance in the image to be formed is excellent.

Further, the toner according to the exemplary embodiment has the above-described configuration, and thereby the fixability in a wide temperature range (so-called fixing latitude) is enhanced, and the low temperature offset resistance and the high temperature offset resistance are enhanced.

The reason is presumed as follows.

The toner according to the exemplary embodiment contains a polar group-containing olefin resin which is a polymer of a composition containing a nonpolar monomer unit (X), a polar monomer unit (Y), and a monomer unit (Z) having a chemical structure different from that of the nonpolar monomer unit (X) and the polar monomer unit (Y). As described above, by containing the resin in which at least three monomer units (X), (Y) and (Z) are polymerized, the fixability in a wide temperature range (so-called fixing latitude) is enhanced. In addition, it is considered that the toner has appropriate flexibility while being elastic in a wide temperature range, and thereby it is possible to realize excellent high temperature offset resistance as well as excellent low temperature offset resistance.

With such a configuration, according to the toner according to the exemplary embodiment, the fixability in a wide temperature range is enhanced, and the low temperature offset resistance and the high temperature offset resistance are enhanced Acid Value In the toner according to the exemplary embodiment, the acid value of the toner is 10 mgKOH/g to 60 mgKOH/g. More specifically, it is 12 mgKOH/g to 50 mgKOH/g, and is further preferably 12 mgKOH/g to 30 mgKOH/g.

When the acid value of the toner is less than 10 mgKOH/g, the bending resistance in the image is deteriorated, and cracks may occur when the image is bent. On the other hand, if the acid value is more than 60 mgKOH/g, image defects may occur in a high temperature and high humidity environment (for example, in an environment at 30° C., 85%). It is considered that the reason for this is that the hygroscopicity of the resin becomes high due to an increase in a hydrophilic group, and cleaning failure occurs under the high temperature and high humidity environment.

The acid value of the toner is measured using the following method. The basic operation is based on JIS K-0070 (1992).

1.5 g of crushed sample is precisely weighed, the sample is put into a 300 ml beaker, and is dissolved by adding 100 ml of tetrahydrofuran (THF), toluene, or xylene. Potentiometric titration is performed with an ethanol solution of 0.1 mol/l potassium hydroxide (KOH) using an automatic titrator GT-100 (manufactured by Mitsubishi Chemical Analytech Co., Ltd.). The amount of KOH solution used at this time is set as A (ml). Also, a blank is measured, and the amount of KOH solution used at this time is set as B (ml). From these values, the acid value is calculated from the following equation. In the equation, w represents the amount of the precisely weighed sample, and f represents a factor of KOH.

$$\text{Acid value (mgKOH/g)} = \{(A-B) \times f \times 5.61\}/w$$

Recording Medium

In the exemplary embodiment, it is preferable that at least one of a hydrogen bond and an ionic bond is formed as an interaction between the recording medium and the carboxy group from the viewpoint of improving the bending resistance in the image. That is, it is preferable to use a recording medium provided with a group capable of forming at least one bond of the hydrogen bond and the ionic bond to a carboxy group on the surface.

Examples of the recording medium provided with a group capable of forming at least one bond of the hydrogen bond and the ionic bond to a carboxy group on the surface include plain paper, coated paper coated with a coating material such as starch, a PET film, and a PP film such as Yupo paper.

Hereinafter, the toner according to the exemplary embodiment will be described in detail.

The toner according to the exemplary embodiment is configured to preferably include a toner particle and if necessary, an external additive.

Toner Particle

The toner particle is configured to include a binder resin and if necessary, a coloring agent, a release agent, and other additives.

Binder Resin

Polar Group-Containing Olefin Resin

In the exemplary embodiment, a polymer of a composition containing the following nonpolar monomer unit (X), polar monomer unit (Y), and monomer unit (Z) is used as the binder resin.

At least one nonpolar monomer unit (X) selected from the group consisting of ethylene and α-olefin having 3 to 10 carbon atoms Polar monomer unit (Y) having at least one of a maleic acid group and a maleic anhydride group Monomer unit (Z) having a polymerizability to at least one of the nonpolar monomer unit (X) and the polar monomer unit (Y)

Nonpolar monomer unit (X)

As the nonpolar monomer unit (X), at least one selected from the group consisting of ethylene and α-olefin having 3 to 10 carbon atoms is used. Note that, as the nonpolar monomer unit (X), from the viewpoint of improving the bending resistance in the image, at least one selected from the group consisting of ethylene and α-olefin having 3 to 6 carbon atoms is preferably used, and at least one selected from the group consisting of ethylene and α-olefin having 3 to 4 carbon atoms is more preferably used.

As the polar group-containing olefin resin, one or two or more kinds of nonpolar monomer units (X) may be used.

Polar Monomer Unit (Y)

As the polar monomer unit (Y), a monomer having at least one of a maleic acid group and a maleic anhydride group is used. That is, a monomer having at least one of the following structures (a) and (b) in the molecular structure is used.

(a)

(b)

Examples of the polar monomer unit (Y) include maleic acid, maleic anhydride, citraconic acid, and citraconic anhydride.

Among them, from the viewpoint of improving the bending resistance in the image, a maleic anhydride and a maleic acid are preferable.

As the polar group-containing olefin resin, one or two or more kinds of polar monomer units (Y) may be used.

Monomer Unit (Z)

The monomer unit (Z) is a monomer having a polymerizability to at least one of the nonpolar monomer unit (X) and the polar monomer unit (Y). Note that, as the monomer unit (Z), a monomer having a chemical structure different from that of the nonpolar monomer unit (X) and the polar monomer unit (Y) is used.

Examples of the monomer unit (Z) include a monomer having an ethylenic double bond (that is, a monomer having a structure of [=C=C=]) and a monomer having a plurality of ethylenic double bonds.

Examples of the monomer having an ethylenic double bond include (meth)acrylic acid and (meth)acrylic acid ester.

Examples of the (meth)acrylic acid ester include (meth)acrylic acid alkyl ester (such as methyl (meth)acrylate, ethyl (meth)acrylate, n-propyl (meth)acrylate, n-butyl (meth)acrylate, n-pentyl (meth)acrylate, n-hexyl (meth)acrylate, n-heptyl (meth)acrylate, n-octyl (meth)acrylate, n-decyl (meth)acrylate, n-dodecyl (meth)acrylate, n-lauryl (meth)acrylate, n-tetradecyl (meth)acrylate, n-hexadecyl (meth)acrylate, n-octadecyl (meth)acrylate, isopropyl (meth)acrylate, isobutyl (meth)acrylate, t-butyl (meth)acrylate, isopentyl (meth)acrylate, amyl (meth)acrylate, neopentyl (meth)acrylate, isohexyl (meth)acrylate, isoheptyl (meth)acrylate, isooctyl (meth)acrylate, 2-ethyl hexyl (meth)acrylate, cyclohexyl (meth)acrylate, and t-butylcyclohexyl (meth)acrylate), (meth)acrylic acid aryl ester (such as phenyl (meth)acrylate, biphenyl (meth)acrylate, diphenylethyl (meth)acrylate, t-butyl phenyl (meth)acrylate, and terphenyl (meth)acrylate), dimethyl aminoethyl (meth)acrylate, diethyl aminoethyl (meth)acrylate, methoxyethyl (meth)acrylate, 2-hydroxyethyl (meth)acrylate, β-carboxyethyl (meth)acrylate, (meth)acrylamide, styrene, alkyl substituted styrene (such as α-methyl styrene, 2-methyl styrene, 3-methyl styrene, 4-methyl styrene, 2-ethyl styrene, 3-ethyl styrene, and 4-ethyl styrene), halogen substituted styrene (such as 2-chlorostyrene, 3-chlorostyrene, and 4-chlorostyrene), and vinyl naphthalene.

In addition, the monomer having the plurality of ethylenic double bonds may also be used.

Examples of the monomer having the plurality of ethylenic double bonds include divinyl benzene, divinyl naphthalene, a di(meth)acrylate compound (such as diethylene glycol di(meth)acrylate, methylene bis(meth)acrylamide, decanediol diacrylate, and glycidyl (meth)acrylate), polyester type di(meth)acrylate, methacrylic acid 2-([1'-methyl propylideneamino] carboxyamino) ethyl.

Examples of the monomers having three or more of ethylenic double bonds include a tri(meth)acrylate compound (such as pentaerythritol tri(meth)acrylate, trimethylolethane tri(meth)acrylate, and trimethylolpropane tri(meth)acrylate), a tetra(meth)acrylate compound (such as pentaerythritol tetra(meth)acrylate, and oligoester (meth)acrylate), 2,2-bis(4-methacryloxy, polyethoxyphenyl) propane, diallyl phthalate, triallyl cyanurate, triallyl isocyanurate, triallyl trimellitate, and diaryl chlorendate.

In the present specification, "(meth) acrylic" is an expression including both "acrylic" and "methacrylic".

Here, as the monomer unit (Z), acrylic ester represented by the following Formula (Z1) is preferable from the viewpoint of low temperature fixability.

$$H_2C=C(R^{Z1})-COO-R^{Z2}$$  Formula(Z1)

In the formula (Z1). $R^{Z1}$ represents a methyl group or an ethyl group, and $R^{Z2}$ represents an alkyl group having 1 to 6 carbon atoms.

$R^{Z2}$ in Formula (Z1) is more preferably an alkyl group having 1 to 4 carbon atoms, and is still more preferably an alkyl group having 1 to 3 carbon atoms.

As the monomer unit (Z), among the acrylic ester represented by Formula (Z1), methyl (meth)acrylate, ethyl (meth)acrylate, n-propyl (meth)acrylate, n-butyl (meth)acrylate, n-pentyl (meth)acrylate, and n-hexyl (meth)acrylate are more preferable.

As the polar group-containing olefin resin, one or two or more kinds of monomer units (Z) may be used.

Ratio of Nonpolar Monomer Unit (X), Polar Monomer Unit (Y), and Monomer Unit (Z)

In the polar group-containing olefin resin, from the viewpoint of sharp melt property at the time of fixing, the proportion of the nonpolar monomer unit (X) is preferably 70% by weight to 90% by weight, and is more preferably 75% by weight to 85% by weight, with respect to the total monomer units.

In the polar group-containing olefin resin, from the viewpoint of improving the bending resistance in the image, the proportion of the polar monomer unit (Y) is 1% by weight to 20% by weight, is more preferably 2% by weight to 17% by weight, and is still more preferably 2% by weight to 10% by weight, with respect to the total monomer units.

In the polar group-containing olefin resin, from the viewpoint of coexistence of low temperature fixability and heat resistance, the proportion of the monomer unit (Z) is preferably 5% by weight to 30% by weight, and is more preferably 10% by weight to 20% by weight, with respect to the total monomer units.

Physical Properties of Polar Group-Containing Olefin Resin or Toner

The melting temperature of the polar group-containing olefin resin is preferably 65° C. to 95° C., is more preferably 70° C. to 90° C., and is still more preferably 75° C. to 85° C.

When the melting temperature of the polar group-containing olefin resin is 65° C. or higher, it becomes easy to improve the storage stability of the toner. On the other hand, when the melting temperature is 95° C. or lower, the low temperature fixability of the toner is likely to be high, and as a result, the fixability in a wide temperature range (so-called fixing latitude) is likely to be enhanced.

According to the method of measuring the melting temperature of the crystalline polyester resin described later, the melting temperature of the polar group-containing olefin resin is determined by the "melting peak temperature" described in the method for determining the melting temperature in JIS K7121-1987 "Method of measuring transition temperature of plastic".

The weight average molecular weight Mw of the polar group-containing olefin resin is preferably 20,000 to 300,000, and is more preferably 50,000 to 200,000.

Note that, the weight average molecular weight Mw of the polar group-containing olefin resin is measured by gel permeation chromatography (GPC) according to the measuring method of the weight average molecular weight of the amorphous polyester resin described later.

In the toner according to the exemplary embodiment, among the entire carboxy groups contained in the toner, the proportion of the carboxy group contained in a maleic acid group and a maleic anhydride group is preferably 10% to 100%, is more preferably 30% to 100%, and is more preferably 50% to 100% from the viewpoint of improving the bending resistance in the image.

Note that, the calculation of the proportion of the carboxy group contained in a maleic acid group and a maleic anhydride group among the entire carboxy groups contained in the toner is performed by extracting the resin from the toner and then identifying the acid group in the extracted resin. The identification of the acid group is performed by measuring the extracted resin by Fourier transform infrared spectroscopy (FT-IR) or nuclear magnetic resonance (NMR).

Here, a method of extracting the resin in the toner will be described.

The physical properties of the polar group-containing olefin resin described above may be measured for the resin extracted from the toner, or may be measured for the polar group-containing olefin resin which is a raw material of the toner.

In order to extract the resin, first, the toner is dissolved in tetrahydrofuran (THF), toluene, or xylene to remove a pigment which is not dissolved in a solvent. Thereafter, the release agent is separated from the solution by the difference in molecular weight (generally, the release agent has a lower molecular weight than the binder resin). Since the molecular weights are different, separation can be performed by a column. In this way, the resin is extracted from the toner.

In the toner according to the exemplary embodiment, the proportion of the polar group-containing olefin resin is preferably 35% by weight to 100% by weight, is more preferably 40% by weight to 100% by weight, and is still more preferably 55% by weight to 100% by weight, with respect to the total mass of the resin components contained in the toner.

When the proportion of the polar group-containing olefin resin is 35% by weight or more, the bending resistance in the image to be formed is likely to be high. In addition, the fixability in a wide temperature range is likely to be enhanced, and the low temperature offset resistance and the high temperature offset resistance are likely to be enhanced.

Other Binder Resins

In the toner according to the exemplary embodiment, as the binder resin, in addition to the polar group-containing olefin resin, other resins may be used in combination.

Examples of the binder resin include vinyl resins formed of homopolymer of monomers such as styrenes (for example, styrene, para-chloro styrene, and α-methyl styrene), (meth)acrylic esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenic unsaturated nitriles (for example, acrylonitrile, and methacrylonitrile), vinyl ethers (for example, vinyl methyl ether, and vinyl isobutyl ether), vinyl ketones (for example, vinyl methyl ketone, vinyl ethyl ketone, and vinyl isopropenyl ketone), and olefins (for example, ethylene, propylene, and butadiene), or copolymers obtained by combining two or more kinds of these monomers.

As the binder resin, there are also exemplified non-vinyl resins such as an epoxy resin, a polyester resin, a polyurethane resin, a polyamide resin, a cellulose resin, a polyether resin, and a modified rosin, a mixture thereof with the above-described vinyl resins, or a graft polymer obtained by polymerizing a vinyl monomer with the coexistence of such non-vinyl resins.

These binder resins may be used alone or in combination of two or more kinds thereof.

In the toner according to the exemplary embodiment, in a case where as the binder resin, other resins are used in combination in addition to the polar group-containing olefin resin, a polyester resin is preferable as the binder resin used in combination. When the polyester resin is contained, the adhesion of the image is likely to be improved.

Examples of the polyester resin include a well-known amorphous polyester resin. As the polyester resin, the crystalline polyester resin may be used in combination with the amorphous polyester resin. Here, the content of the crystalline polyester resin may be used in a range of 2% by weight to 40% by weight (preferably 2% by weight to 20% by weight) with respect to the entire binder resin.

In addition, "crystallinity" of resin means to have a clear endothermic peak instead of a stepwise endothermic change in differential scanning calorimetry (DSC), and specifically means that the half-width of the endothermic peak at the time of being measured at a temperature elevation rate of 10 (° C./min) is within 10° C.

On the other hand, "amorphous" of the resin means that the half-width exceeds 10° C., a stepwise endothermic change is exhibited, or a clear endothermic peak is not observed.

Amorphous Polyester Resin

Examples of amorphous polyester resins include condensation polymers of polyvalent carboxylic acids and polyhydric alcohols. Among these, as the amorphous polyester resin, a commercial product may be used or synthesized product may be used.

Examples of the polyvalent carboxylic acid include aliphatic dicarboxylic acid (for example, oxalic acid, malonic acid, maleic acid, fumaric acid, citraconic acid, itaconic acid, glutaconic acid, succinic acid, alkenyl succinic acid, adipic acid, and sebacic acid), alicyclic dicarboxylic acid (for example, cyclohexane dicarboxylic acid), aromatic dicarboxylic acid (for example, terephthalic acid, isophthalic acid, phthalic acid, and naphthalene dicarboxylic acid), an anhydride thereof, or lower alkyl esters (having, for example, from 1 to 5 carbon atoms) thereof. Among these, for example, aromatic dicarboxylic acids are preferably used as the polyvalent carboxylic acid.

As the polyvalent carboxylic acid, tri- or higher-valent carboxylic acid employing a crosslinked structure or a branched structure may be used in combination together with dicarboxylic acid. Examples of the tri- or higher-valent carboxylic acid include trimellitic acid, pyromellitic acid, anhydrides thereof, or lower alkyl esters (having, for example, 1 to 5 carbon atoms) thereof.

The polyvalent carboxylic acids may be used alone or in combination of two or more types thereof.

Examples of the polyhydric alcohol include aliphatic diol (for example, ethylene glycol, diethylene glycol, triethylene glycol, propylene glycol, butanediol, hexanediol, and neopentyl glycol), alicyclic diol (for example, cyclohexanediol, cyclohexane dimethanol, and hydrogenated bisphenol A), aromatic diol (for example, an ethylene oxide adduct of bisphenol A, and a propylene oxide adduct of bisphenol A). Among these, for example, aromatic diols and alicyclic diols are preferably used, and aromatic diols are more preferably used as the polyhydric alcohol.

As the polyhydric alcohol, a tri- or higher-valent polyhydric alcohol employing a crosslinked structure or a branched structure may be used in combination together with diol. Examples of the tri- or higher-valent polyhydric alcohol include glycerin, trimethylolpropane, and pentaerythritol.

The polyhydric alcohol may be used alone or in combination of two or more types thereof.

The glass transition temperature Tg of the amorphous polyester resin is preferably in a range of 50° C. to 80° C., and more preferably in a range of 50° C. to 65° C.

The glass transition temperature is obtained from a DSC curve obtained by differential scanning calorimetry (DSC). More specifically, the glass transition temperature is obtained from "extrapolated glass transition onset temperature" described in the method of obtaining a glass transition temperature in JIS K 7121-1987 "testing methods for transition temperatures of plastics".

The weight average molecular weight Mw of the amorphous polyester resin is preferably in a range of 5,000 to 1,000,000, and is more preferably in a range of 7,000 to 500,000.

The number average molecular weight Mn of the amorphous polyester resin is preferably in a range of 2,000 to 100,000.

The molecular weight distribution Mw/Mn of the amorphous polyester resin is preferably in a range of 1.5 to 100, and is more preferably in a range of 2 to 60.

The weight average molecular weight and the number average molecular weight are measured by gel permeation chromatography (GPC). The molecular weight measurement by GPC is performed using GPC & HLC-8120 GPC, manufactured by Tosoh Corporation as a measuring device, Column TSK gel Super HM-M (15 cm), manufactured by Tosoh Corporation, and a THF solvent. The weight average molecular weight and the number average molecular weight are calculated by using a molecular weight calibration curve plotted from a monodisperse polystyrene standard sample from the results of the foregoing measurement.

A known preparing method is used to produce the amorphous polyester resin. Specific examples thereof include a method of conducting a reaction at a polymerization temperature set to be in a range of 180° C. to 230° C., if necessary, under reduced pressure in the reaction system, while removing water or an alcohol generated during condensation.

When monomers of the raw materials are not dissolved or compatibilized under a reaction temperature, a high-boiling-point solvent may be added as a solubilizing agent to dissolve the monomers. In this case, a polycondensation reaction is conducted while distilling away the solubilizing agent. When a monomer having poor compatibility is present in a copolymerization reaction, the monomer having poor compatibility and an acid or an alcohol to be polycondensed with the monomer may be previously condensed and then polycondensed with the major component.

Crystalline Polyester Resin

Examples of the crystalline polyester resin include a condensation polymer of polyvalent carboxylic acid and polyhydric alcohol. As the crystalline polyester resin, a commercial product may be used or synthesized product may be used.

Here, in order to easily form a crystalline structure, the crystalline polyester resin is preferably a polycondensate using a polymerizable monomer having a linear aliphatic group rather than a polymerizable monomer having an aromatic group.

Examples of the polyvalent carboxylic acid include aliphatic dicarboxylic acid (such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acid (such as phthalic acid, isophthalic acid, terephthalic acid, dibasic acids such as naphthalene-2, 6-dicarboxylic acid), and anhydrides thereof or lower alkyl esters (having, for example, from 1 to 5 carbon atoms) thereof.

As the polyvalent carboxylic acid, tri- or higher-valent carboxylic acid employing a crosslinked structure or a branched structure may be used in combination together with dicarboxylic acid. Examples of trivalent carboxylic acids include aromatic carboxylic acid (such as 1,2,3-benzenetricarboxylic acid, 1,2,4-benzenetricarboxylic acid, and 1,2,4-naphthalenetricarboxylic acid), and anhydrides thereof or lower alkyl esters (having, for example, from 1 to 5 carbon atoms) thereof.

As the polyvalent carboxylic acid, a dicarboxylic acid having a sulfonic acid group and a dicarboxylic acid having an ethylenic double bond may be used in combination with these dicarboxylic acids.

The polyvalent carboxylic acids may be used alone or in combination of two or more kinds thereof.

Examples of polyhydric alcohols include aliphatic diols (for example, straight-chain aliphatic diols having 7 or more and 20 or less carbon atoms in the main chain portion).

Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosan decanediol. Among these, 1,8-octanediol, 1,9-nonanediol, and 1,10-decanediol are preferable as the aliphatic diol.

As the polyhydric alcohol, a tri- or higher-valent alcohol employing a crosslinked structure or a branched structure may be used in combination together with diol. Examples of the tri- or higher-valent alcohols include glycerin, trimethylolethane, trimethylolpropane, and pentaerythritol. The polyhydric alcohol may be used alone or in combination of two or more kinds thereof.

Here, the polyhydric alcohol preferably has an aliphatic diol content of 80% by mol or more, and more preferably 90% by mol or more.

The melting temperature of the crystalline polyester resin is preferably 50° C. to 100° C., is more preferably 55° C. to 90° C., and is still more preferably 60° C. to 85° C.

Note that, the melting temperature is obtained from a DSC curve obtained by differential scanning calorimetry (DSC), and specifically obtained from "melting peak temperature" described in the method of obtaining a melting temperature in JIS K 7121-1987 "testing methods for transition temperatures of plastics".

The weight average molecular weight Mw of the crystalline polyester resin is preferably 6,000 to 35,000.

Similar to the amorphous polyester resin, the crystalline polyester resin can be obtained by a known production method.

The content of the entire binder resins including the polar group-containing olefin resin is, for example, preferably 40% by weight to 95% by weight, is more preferably 50% by weight to 90% by weight, and is still more preferably 60% by weight to 85% by weight, with respect to the entire toner particles.

Coloring Agent

Examples of the coloring agent include various types of pigments such as carbon black, chrome yellow, Hansa yellow, benzidine yellow, threne yellow, quinoline yellow, pigment yellow, Permanent Orange GTR, Pyrazolone Orange, Vulcan Orange, Watch Young Red, Permanent Red, Brilliant Carmine 3B, Brilliant Carmine 6B, DuPont Oil Red, Pyrazolone Red, Lithol Red, Rhodamine B Lake, Lake Red C, Pigment Red, Rose Bengal, Aniline Blue, Ultramarine Blue, Calco Oil Blue, Methylene Blue Chloride, Phthalocyanine Blue, Pigment Blue, Phthalocyanine Green, and Malachite Green Oxalate, or various types of dyes such as acridine dye, xanthene dye, azo dye, benzoquinone dye, azine dye, anthraquinone dye, thioindigo dye, dioxazine dye, thiazine dye, azomethine dye, indigo dye, phthalocyanine dye, aniline black dye, polymethine dye, triphenylmethane dye, diphenylmethane dye, and thiazole dye.

In addition, a white pigment may be included as a coloring agent. Examples of the white pigment include titanium oxide (such as a titanium oxide particle having an anatase type and a titanium oxide particle having a rutile type), barium sulfate, zinc oxide, and calcium carbonate. Among them, titanium oxide is preferable as the white pigment.

In addition, a brilliant pigment may be included as a coloring agent. Examples of the brilliant pigment include pearl pigment powder, aluminum powder, metal powder such as stainless steel powder, metal flakes, glass beads, glass flakes, mica, and micaceous iron oxide.

The coloring agent may be used alone or two or more kinds thereof may be used in combination.

As the coloring agent, a surface-treated coloring agent may be used if necessary, and it may be used together with a dispersing agent. Further, a plurality of kinds of the coloring agents may be used in combination.

The content of the coloring agent is preferably 1% by weight to 30% by weight, and is more preferably 3% by weight to 15% by weight with respect to the entire toner particles.

Release Agent

Examples of the release agent include hydrocarbon waxes; natural waxes such as carnauba wax, rice wax, and candelilla wax; synthetic waxes or mineral or petroleum waxes such as montan wax; and ester waxes such as fatty acid esters and montanic acid esters. However, the release agent is not limited to the above examples.

The melting temperature of the release agent is preferably in a range of 50° C. to 110° C., and is further preferably in a range of 60° C. to 100° C.

Note that, the melting temperature is obtained from a DSC curve obtained by differential scanning calorimetry (DSC), and specifically obtained from "melting peak temperature" described in the method of obtaining a melting temperature in JIS K 7121-1987 "testing methods for transition temperatures of plastics".

The content of the release agent is preferably 1% by weight to 20% by weight, and is more preferably 5% by weight to 15% by weight with respect to the entire toner particles.

Other Additives

Examples of other additives include well-known additives such as a magnetic material, an electrostatic charge control agent, and an inorganic powder. These additives are included in the toner particles as internal additives.

Properties of Toner Particle

The toner particles may be toner particles having a single-layer structure, or toner particles having a so-called core and shell structure composed of a core (so-called core particle) and a coating layer (so-called shell layer) coated on the core.

Here, the toner particles having a core and shell structure is preferably composed of, for example, a core containing a binder resin, and if necessary, other additives such as a coloring agent and a release agent and a coating layer containing a binder resin.

The volume average particle diameter D50v of the toner particle is preferably 2 μm to 10 μm, and is more preferably 4 μm to 8 μm.

Various average particle diameters of the toner particles and various particle diameter distribution indices are measured using Coulter Multisizer II (manufactured by Beckman Coulter, Inc.), and the electrolytic solution is measured using ISOTON-II (manufactured by Beckman Coulter, Inc.).

In the measurement, a measurement sample in a range of 0.5 mg to 50 mg is added as a dispersing agent to 2 ml of a 5% aqueous solution of surfactant which is preferably sodium alkyl benzene sulfonate. The obtained material is added to the electrolyte in a range of 100 ml to 150 ml.

The electrolyte in which the sample is suspended is subjected to a dispersion treatment using an ultrasonic disperser for one minute, and a particle diameter distribution of particles having a particle diameter of from 2 μm to 60 μm is measured by a Coulter Multisizer II using an aperture having an aperture diameter of 100 μm, 50,000 particles are sampled.

Cumulative distributions by volume and by number are drawn from the side of the smallest diameter with respect to particle diameter ranges (so-called channels) separated based on the measured particle diameter distribution. The particle diameter corresponding to the cumulative percentage of 16% is defined as that corresponding to a volume average particle diameter D16v and a number average particle diameter D16p, while the particle diameter corresponding to the cumulative percentage of 50% is defined as that corresponding to a volume average particle diameter D50v and a number average particle diameter D50p. Furthermore, the particle diameter corresponding to the cumulative percentage of 84% is defined as that corresponding to a volume average particle diameter D84v and a number average particle diameter D84p.

Using these, a volume particle diameter distribution index (GSDv) is calculated as $(D84v/D16v)^{1/2}$, while a number particle diameter distribution index (GSDp) is calculated as $(D84p/D16p)^{1/2}$.

The average circularity of the toner particles is preferably 0.94 to 1.00, and is more preferably 0.95 to 0.98.

The average circularity of the toner particles is calculated by (circumference length of equivalent circle)/(circumference length) [(circumference length of circle having the same projected area as that of particle image)/(circumference length of particle projected image)]. Specifically, the aforementioned value is measured by using the following method.

The average circularity of the toner particles is calculated by using a flow particle image analyzer (FPIA-3,000 manufactured by Sysmex Corporation) which first, suctions and collects the toner particles to be measured so as to form flake flow, then captures a particle image as a static image by instantaneously emitting strobe light, and then performs image analysis of the obtained particle image. 3,500 particles are sampled at the time of calculating the average circularity.

In a case where the toner contains an external additive, the developer containing the toner to be measured is dispersed in the water containing a surfactant, and then the water is subjected to an ultrasonic treatment so as to obtain the toner particles in which the external additive is removed.

External Additive

Examples of the external additive include an inorganic particle. Examples of the inorganic particle include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)n$, $Al_2O_3 \cdot 2SiO_2$, $CaCO_3$, $MgCO_3$, $BaSO_4$, and $MgSO_4$.

The surface of the inorganic particle as the external additive may be subjected to a hydrophobization treatment. The hydrophobization treatment is performed, for example, by immersing inorganic particles in a hydrophobization treating agent. The hydrophobization treating agent is not particularly limited, and examples thereof include a silane coupling agent, a silicone oil, a titanate coupling agent, and an aluminum coupling agent. These may be used alone or two or more kinds thereof may be used in combination.

The amount of the hydrophobization treating agent is generally, for example, 1 part by weight to 10 parts by weight with respect to 100 parts by weight of the inorganic particles.

Examples of the external additive include a resin particle (such as polystyrene, polymethyl methacrylate (PMMA), and a melamine resin), a cleaning agent (such as a metal salt of higher fatty acid represented by zinc stearate, and a particle of a fluorine-based polymer).

The content of the external additive is preferably 0.01% by weight to 5% by weight, and is more preferably 0.01% by weight to 2.0% by weight with respect to the entire toner particles.

Method of Producing Toner

Next, a method of producing toner of the exemplary embodiment will be described.

The toner according to the exemplary embodiment can be obtained by producing a toner particle and then externally adding an external additive to the toner particle.

The toner particles may be produced by using any one of a drying method (for example, a kneading and pulverizing method) and a wetting method (for example, an aggregation and coalescence method, a suspension polymerization method, and a dissolution suspension method). The preparing method of the toner particles is not particularly limited, and well-known method may be employed.

Among them, the toner particles may be obtained by using the aggregation and coalescence method.

Specifically, for example, in a case where the toner particles are produced by using the aggregation and coalescence method, the toner particles are produced through the following steps. The steps include a step (a resin particle dispersion preparing step) of preparing a resin particle dispersion in which resin particles constituting the binder resin are dispersed, a step (an aggregated particle forming step) of forming aggregated particles by aggregating the resin particles (other particles if necessary), in the resin particle dispersion (in the dispersion in which other particle dispersions are mixed, if necessary); and a step (a coalescence step) of forming a toner particle by coalescing aggregated particles by heating an aggregated particle dispersion in which aggregated particles are dispersed so as to prepare a toner particle.

Hereinafter, the respective steps will be described in detail.

In the following description, a method of obtaining toner particles including the coloring agent and the release agent will be described; however, the coloring agent and the release agent are used if necessary. Other additives other than the coloring agent and the release agent may also be used.

Resin Particle Dispersion Preparing Step

First, a resin particle dispersion in which the resin particles corresponds to the binder resins are dispersed, a coloring agent particle dispersion in which coloring agent particles are dispersed, and a release agent particle dispersion in which the release agent particles are dispersed are prepared, for example.

Here, the resin particle dispersion is, for example, prepared by dispersing the resin particles in a dispersion medium with a surfactant.

An aqueous medium is used, for example, as the dispersion medium used in the resin particle dispersion.

Examples of the aqueous medium include water such as distilled water, ion exchange water, or the like, alcohols, and the like. The medium may be used alone or two or more kinds thereof may be used in combination.

Examples of the surfactant include anionic surfactants such as sulfate, sulfonate, phosphate, and soap anionic surfactants; cationic surfactants such as amine salt and quaternary ammonium salt cationic surfactants; and nonionic surfactants such as polyethylene glycol, alkyl phenol ethylene oxide adduct, and polyhydric alcohol. Among them, anionic surfactants and cationic surfactants are particularly preferable. Nonionic surfactants may be used in combination with anionic surfactants or cationic surfactants.

The surfactants may be used alone or two or more kinds thereof may be used in combination.

In the resin particle dispersion, as a method of dispersing the resin particles in the dispersion medium, a common dispersing method by using, for example, a rotary shearing-type homogenizer, a ball mill having media, a sand mill, or a Dyno mill is exemplified. Further, depending on the kinds of the resin particles, the resin particles may be dispersed in the resin particle dispersion by using, for example, a phase inversion emulsification method.

The phase inversion emulsification method is a method of dispersing a resin in an aqueous medium in a particle form by dissolving a resin to be dispersed in a hydrophobic organic solvent in which the resin is soluble, conducting neutralization by adding a base to an organic continuous phase (O phase), and performing inversion (so called phase inversion) of the resin from W/O to O/W to make discontinuous phase by adding an aqueous medium (W phase).

The volume average particle diameter of the resin particles dispersed in the resin particle dispersion is, for example, preferably from 0.01 μm to 1 μm, is more preferably from 0.08 μm to 0.8 μm, and is still more preferably from 0.1 μm to 0.6 μm. Regarding the volume average particle diameter of the resin particles, a cumulative distribution by volume is drawn from the side of the smallest diameter with respect to particle diameter ranges (so-called channels) separated using the particle diameter distribution obtained by the measurement of a laser diffraction-type particle diameter distribution measuring device (for example, manufactured by Horiba, Ltd., LA-700), and a particle diameter corresponding to the cumulative percentage of 50% with respect to the entire particles is set as a volume average particle diameter D50v. Note that, the volume average particle diameter of the particles in other dispersion liquids is also measured in the same manner.

The content of the resin particles contained in the resin particle dispersion is preferably from 5% by weight to 50% by weight, and is more preferably from 10% by weight to 40% by weight.

Note that, the coloring agent particle dispersion and the release agent particle dispersion are also prepared in the same manner as in the case of the resin particle dispersion. That is, the volume average particle diameter of the particles in the resin particle dispersion, dispersion medium, the dispersing method, and the content of the particles are the same as those in the coloring agent particles dispersed in the coloring agent particle dispersion and the release agent particles dispersed in the release agent particle dispersion.

Aggregated Particle Forming Step

Next, the resin particle dispersion, the coloring agent particle dispersion, and the release agent particle dispersion are mixed with each other.

In addition, in the mixed dispersion, the resin particle, the coloring agent particle, and the release agent particle are heteroaggregated, and thereby an aggregated particle which has a diameter close to a targeted diameter of the toner particle and contains the resin particle, the coloring agent particle, and the release agent particle is formed.

Specifically, for example, an aggregating agent is added to the mixed dispersion and a pH of the mixed dispersion is adjusted to be acidic (for example, the pH is from 2 to 5). If necessary, a dispersion stabilizer is added. Then, the mixed dispersion is heated at a temperature close to a glass transition temperature of the resin particles (specifically, for example, in a range of glass transition temperature of $-30°$ C. to glass transition temperature of $-10°$ C. of the resin particles) to aggregate the particles dispersed in the mixed dispersion, thereby forming the aggregated particles.

In the aggregated particle forming step, for example, the aggregating agent may be added at room temperature (for example, 25° C.) while stirring of the mixed dispersion using a rotary shearing-type homogenizer, the pH of the mixed dispersion may be adjusted to be acidic (for example, the pH is from 2 to 5), a dispersion stabilizer may be added if necessary, and then the heating may be performed.

Examples of the aggregating agent include a surfactant having an opposite polarity to the polarity of the surfactant used as the dispersing agent to be added to the mixed dispersion, an inorganic metal salt, a divalent or more metal complex. Particularly, when a metal complex is used as the aggregating agent, the amount of the surfactant used is reduced and charging properties are improved. An additive for forming a complex or a similar bond with metal ions as the aggregating agent may be used, if necessary. A chelating agent is suitably used as the additive.

Examples of the inorganic metal salt include metal salt such as calcium chloride, calcium nitrate, barium chloride, magnesium chloride, zinc chloride, aluminum chloride, and aluminum sulfate, and an inorganic metal salt polymer such as poly aluminum chloride, poly aluminum hydroxide, and calcium polysulfide.

As the chelating agent, an aqueous chelating agent may be used. Examples of the chelating agent include oxycarboxylic acid such as tartaric acid, citric acid, and gluconic acid, iminodiacetic acid (IDA), nitrilotriacetic acid (NTA), and ethylenediaminetetraacetic acid (EDTA).

The additive amount of the chelating agent is, for example, preferably in a range of 0.01 parts by weight to 5.0 parts by weight, and is more preferably equal to or greater than 0.1 parts by weight and less than 3.0 parts by weight, with respect to 100 parts by weight of the resin particles.

Coalescence Step

Next, the aggregated particle dispersion in which the aggregated particles are dispersed is heated at, for example, a temperature that is equal to or higher than the glass transition temperature of the resin particles (for example, a temperature that is higher than the glass transition temperature of the resin particles by 10° C. to 30° C.) to perform the coalesce on the aggregated particles and form toner particles.

The toner particles are obtained through the foregoing steps.

Note that, the toner particles may be obtained through a step of forming a second aggregated particles in such a manner that an aggregated particle dispersion in which the aggregated particles are dispersed is obtained, the aggregated particle dispersion and a resin particle dispersion in which resin particles are dispersed are mixed, and the mixtures are aggregated so as to attach the resin particle on the surface of the aggregated particle, and a step of forming the toner particles having a core and shell structure by heating a second aggregated particle dispersion in which the second aggregated particles are dispersed, and coalescing the second aggregated particles.

Here, after the coalescence step ends, the toner particles formed in the solution are subjected to a washing step, a solid-liquid separation step, and a drying step, that are well known, and thus dry toner particles are obtained.

In the washing step, displacement washing using ion exchange water may be sufficiently performed from the viewpoint of charging properties. In addition, the solid-liquid separation step is not particularly limited, but suction filtration, pressure filtration, or the like is preferably performed from the viewpoint of productivity. The method of the drying step is also not particularly limited, but freeze drying, airflow drying, fluidized drying, vibration-type fluidized drying, or the like may be performed from the viewpoint of productivity.

The toner according to the exemplary embodiment is produced, for example, by adding an external additive to the obtained toner particles in the dry state and mixing them. The mixing may be performed by using, for example, a V blender, a Henschel mixer, a Loedige mixer, or the like. Furthermore, if necessary, coarse particles of the toner may be removed by using a vibration sieving machine, a wind classifier, or the like.

Electrostatic Charge Image Developer

The electrostatic charge image developer according to the exemplary embodiment contains at least the toner according to the exemplary embodiment. The electrostatic charge image developer according to the exemplary embodiment may be a one-component developer containing only the toner according to the exemplary embodiment, or may be a two-component developer in which the toner and the carrier are mixed with each other.

The carrier is not particularly limited, and a well-known carrier may be used. Examples of the carrier include a coating carrier in which a surface of a core formed of magnetic particle is coated with a coating resin; a magnetic particle dispersion-type carrier in which magnetic particles are dispersed and distributed in a matrix resin; and a resin impregnated-type carrier in which a resin is impregnated into porous magnetic particles.

Note that, the magnetic particle dispersion-type carrier and the resin impregnated-type carrier may be a carrier in which the forming particle of the aforementioned carrier is set as a core and the core is coated with the coating resin.

Examples of the magnetic particle include a magnetic metal such as iron, nickel, and cobalt, and a magnetic oxide such as ferrite, and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin formed by containing an organosiloxane bond or the modified products thereof, a fluororesin, polyester, polycarbonate, a phenol resin, and an epoxy resin. Note that, other additives such as the conductive particles may be contained in the coating resin and the matrix resin.

Examples of the conductive particle include metal such as gold, silver, and copper, and particles such as carbon black, titanium oxide, zinc oxide, tin oxide, barium sulfate, aluminum borate, and potassium titanate.

Here, in order to coat the surface of the core with the coating resin, a method of coating the surface with a coating layer forming solution in which the coating resin, and various additives if necessary are dissolved in a proper solvent is used. The solvent is not particularly limited as long as a solvent is selected in consideration of a coating resin to be used and coating suitability.

Specific examples of the resin coating method include a dipping method of dipping the core into the coating layer forming solution, a spray method of spraying the coating layer forming solution onto the surface of the core, a fluid-bed method of spraying the coating layer forming solution to the core in a state of being floated by the fluid air, and a kneader coating method of mixing the core of the carrier with the coating layer forming solution and removing a solvent in the kneader coater.

The mixing ratio (mass ratio) of toner to carrier in the two-component developer is preferably toner:carrier=1:100 to 30:100, and is more preferably 3:100 to 20:100.

Image Forming Apparatus and Image Forming Method

An image forming apparatus and an image forming method according to the exemplary embodiment will be described.

The image forming apparatus according to the exemplary embodiment is provided with an image holding member, a charging unit that charges the surface of the image holding member, an electrostatic charge image forming unit that forms an electrostatic charge image on the charged surface of the image holding member, a developing unit that accommodates an electrostatic charge image developer, and develops the electrostatic charge image formed on the surface of the image holding member as a toner image by using the electrostatic charge image developer, a transfer unit that transfers the toner image formed on the surface of the image holding member to a surface of a recording medium, and a fixing unit that fixes the toner image transferred onto the surface of the recording medium. In addition, the electrostatic charge image developer according to the exemplary embodiment is used as the electrostatic charge image developer.

In the image forming apparatus according to the exemplary embodiment, an image forming method (the image forming method according to the exemplary embodiment) including a step of charging a surface of an image holding member, a step of forming an electrostatic charge image on the charged surface of the image holding member, a step of developing an electrostatic charge image formed on the surface of the image holding member as a toner image with the electrostatic charge image developer according to the exemplary embodiment, a step of transferring the toner image formed on the surface of the image holding member to a surface of a recording medium, and a step of fixing the toner image transferred to the surface of the recording medium is performed.

As the image forming apparatus according to the exemplary embodiment, well-known image forming apparatuses such as an apparatus including a direct-transfer type apparatus that directly transfers the toner image formed on the surface of the image holding member to the recording medium; an intermediate transfer type apparatus that primarily transfers the toner image formed on the surface of the image holding member to a surface of an intermediate transfer body, and secondarily transfers the toner image transferred to the surface of the intermediate transfer body to the surface of the recording medium; an apparatus a cleaning unit that cleans the surface of the image holding member before being charged and after transferring the toner image; and an apparatus includes an erasing unit that erases charges by irradiating the surface of the image holding member with erasing light before being charged and after transferring the toner image.

In a case where the intermediate transfer type apparatus is used, the transfer unit is configured to include an intermediate transfer body that transfers the toner image to the surface, a first transfer unit that primarily transfers the toner image formed on the surface of the image holding member to the surface of the intermediate transfer body, and a second transfer unit that secondarily transfers the toner image formed on the surface of the intermediate transfer body to the surface of the recording medium.

In the image forming apparatus according to the exemplary embodiment, for example, a unit including the developing unit may be a cartridge structure (process cartridge) detachable from the image forming apparatus. As a process cartridge, for example, a process cartridge including the developing unit accommodating the electrostatic charge image developer according to the exemplary embodiment is preferably used.

Hereinafter, an example of the image forming apparatus according to the exemplary embodiment will be described. However, the process cartridge is not limited thereto. Major parts shown in the drawing will be described, but descriptions of other parts will be omitted.

Figure 1:
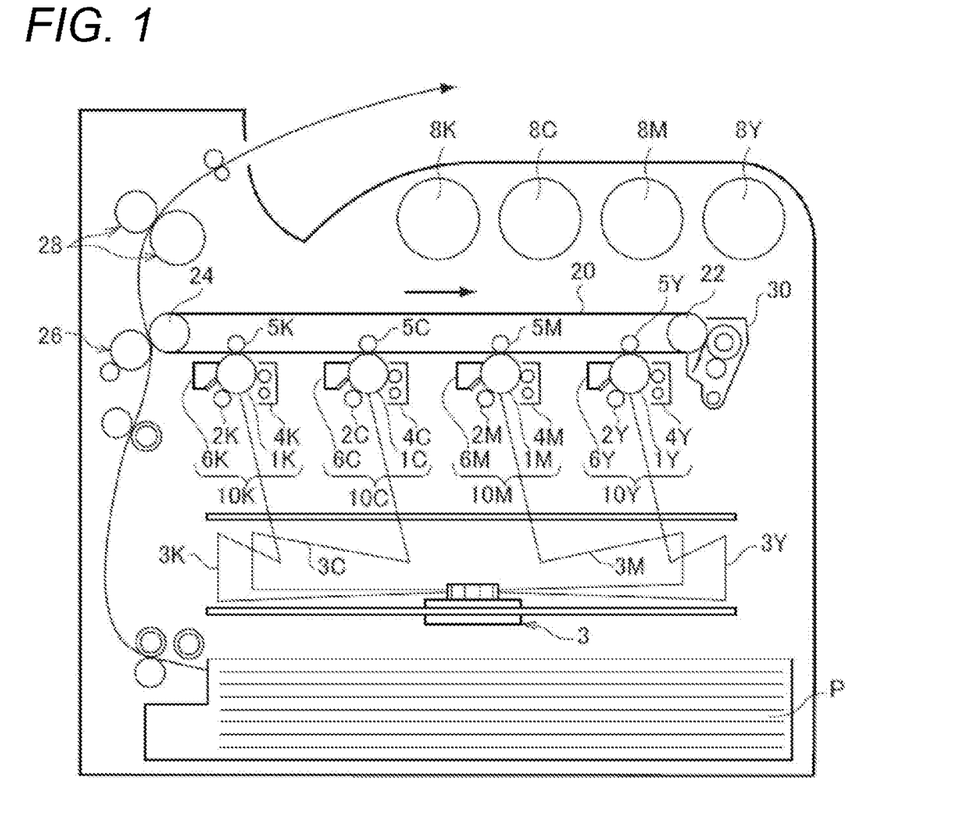
FIG. 1 is a configuration diagram illustrating an example of an image forming apparatus according to the exemplary embodiment.

FIG. 1 is a configuration diagram illustrating an image forming apparatus according to the exemplary embodiment.

The image forming apparatus as illustrated in FIG. 1 is provided with electrophotographic first to fourth image forming units 10Y, 10M, 10C, and 10K (image forming means) that output an image of each color of yellow (Y), magenta (M), cyan (C), and black (K) based on color separated image data. These image forming units (hereinafter, referred to simply as "units" in some cases) 10Y, 10M, 10C, and 10K are arranged in parallel in the horizontal direction with a predetermined distance therebetween. Note that, these units 10Y, 10M, 10C, and 10K may be a process cartridge which is attached to and detached from the image forming apparatus.

On the upper side of the respective units 10Y, 10M, 10C, and 10K in the drawing, an intermediate transfer belt 20 as an intermediate transfer body is extended through the respective units. The intermediate transfer belt 20 is wound around a drive roll 22 and a support roll 24 in contact with the inner surface of the intermediate transfer belt 20, which are spaced apart from each other in the left to right direction in the drawing, and travels in the direction toward the first unit 10Y to the fourth unit 10K. A force is applied to the support roll 24 in a direction away from the drive roll 22 by a spring or the like (not shown), and a tension is applied to the intermediate transfer belt 20 wound around both rolls.

An intermediate transfer body cleaning device 30 is provided on the side surface of the image holding member of the intermediate transfer belt 20 so as to face the drive roll 22. In addition, the toner including four color toners of yellow, magenta, cyan, and black contained in toner cartridges 8Y, 8M, 8C, and 8K in the developing machines (developing unit) 4Y, 4M, 4C, and 4K of the respective units 10Y, 10M, 10C, and 10K is supplied.

Since the first to fourth units 10Y, 10M, 10C, and 10K have the same configuration, here, the first unit 10Y for forming a yellow image disposed on the upstream side in the traveling direction of the intermediate transfer belt will be described as a representative. By denoting reference numerals with magenta (M), cyan (C), and black (K) instead of yellow (Y) to the same portions as those in the first unit 10Y, description of the second to fourth units 10M, 10C, and 10K will be omitted.

The first unit 10Y includes a photosensitive body 1Y which functions as an image holding member. Around the photosensitive body 1Y, a charging roll (an example of the charging unit) 2Y that charges the surface of the photosensitive body 1Y to a predetermined potential, an exposure device (an example of the electrostatic charge image forming unit) 3 that forms an electrostatic charge image by exposing the charged surface with a laser beam 3Y based on a color separated image signal, a developing machine (an example of the developing unit) 4Y that develops an electrostatic charge image by supplying toner charged to the electrostatic charge image, a first transfer roll 5Y (an example of the first transfer unit) that transfers the developed toner image onto the intermediate transfer belt 20, and a photosensitive body cleaning device (an example of the cleaning unit) 6Y that removes the toner remaining on the surface of the photosensitive body 1Y after first transfer are arranged in order.

The first transfer roll 5Y is disposed on the inner side of the intermediate transfer belt 20, and is provided at a position facing the photosensitive body 1Y Further, a bias power supply (not shown) for applying a first transfer bias is connected to each of the first transfer rolls 5Y, 5M, 5C, and 5K. Each bias power supply varies the transfer bias applied to each first transfer roll under the control of a control unit (not shown).

Hereinafter, an operation of forming a yellow image in the first unit 10Y will be described. First, prior to the operation, the surface of the photosensitive body 1Y is charged to a potential of −600 V to −800 V by the charging roll 2Y.

The photosensitive body 1Y is formed by laminating a photosensitive layer on a conductive (for example, volume resistivity at 20° C.: $1 \times 10^{-6}$ Ωcm or less) substrate. This photosensitive layer generally has high resistance (resistance of general resin), but has the property that the specific resistance of the portion irradiated with the laser beam changes when the laser beam 3Y is irradiated. Therefore, the laser beam 3Y is output to the surface of the charged photosensitive body 1Y through the exposure device 3 in accordance with the image data for yellow sent from the control unit (not shown). The laser beam 3Y is applied to the photosensitive layer on the surface of the photosensitive body 1Y, and thereby, an electrostatic charge image of a yellow image pattern is formed on the surface of the photosensitive body 1Y.

The electrostatic charge image is an image formed on the surface of the photosensitive body 1Y by charging, and is a so-called negative latent image formed in such a manner that the specific resistance of the irradiated portion of the photosensitive layer is reduced by the laser beam 3Y, and the electric charge charged on the surface of the photosensitive body 1Y flows, and the charge of the portion with which the laser beam 3Y is not irradiated remains.

The electrostatic charge image formed on the photosensitive body 1Y is rotated to a predetermined development position as the photosensitive body 1Y travels. Then, at this development position, the electrostatic charge image on the photosensitive body 1Y is made visible (developed image) as a toner image by the developing machine 4Y.

In the developing machine 4Y, for example, an electrostatic charge image developer containing at least a yellow toner and a carrier is accommodated. The yellow toner is frictionally charged by being stirred inside the developing machine 4Y, and is held on a developer roll (an example of the developer holding body) with a charge of the same polarity (negative polarity) as the charged electric charge on the photosensitive body 1Y. Then, as the surface of the photosensitive body 1Y passes through the developing machine 4Y, the yellow toner is electrostatically attached to a discharged latent image portion on the surface of the photosensitive body 1Y, and the latent image is developed by the yellow toner. The photosensitive body 1Y on which a yellow toner image is formed is subsequently traveled at a predetermined speed, and the toner image developed on the photosensitive body 1Y is transported to a predetermined first transfer position.

When the yellow toner image on the photosensitive body 1Y is transported to the first transfer, the first transfer bias is applied to the first transfer roll 5Y, the electrostatic force from the photosensitive body 1Y toward the first transfer roll 5Y acts on the toner image, and the toner image on the photosensitive body 1Y is transferred onto the intermediate transfer belt 20. The transfer bias applied at this time is (+) polarity opposite to polarity (−) of the toner, and for example, in the first unit 10Y, it is controlled to +10 μA by the control unit (not shown).

On the other hand, the toner remaining on the photosensitive body 1Y is removed and collected by a photosensitive body cleaning device 6Y.

Further, the first transfer bias applied to the first transfer rolls 5M, 5C, and 5K after a second unit 10M is also controlled according to the first unit.

In this way, the intermediate transfer belt 20 to which the yellow toner image is transferred in the first unit 10Y is sequentially transported through the second to fourth units 10M, 10C, and 10K, and the toner images of the respective colors are superimposed and transferred in multiples.

The intermediate transfer belt 20 on which toner images of four colors are multiply transferred through the first to fourth units leads to a second transfer portion configured to include the intermediate transfer belt 20 and the support roll 24 in contact with the inner surface of the intermediate transfer belt and a second transfer roll (an example of a second transfer means) 26 disposed on the image holding surface side of the intermediate transfer belt 20. On the other hand, the recording sheet (an example of the recording medium) P is fed at a predetermined timing to the gap where the second transfer roll 26 and the intermediate transfer belt 20 are in contact with each other via a supply mechanism, and the second transfer bias is applied to the support roll 24. The transfer bias applied at this time is the same polarity (−) as the polarity (−) of the toner, and the electrostatic force from the intermediate transfer belt 20 to the recording sheet P acts on the toner image such that the toner image is transferred onto the recording sheet P on the intermediate transfer belt 20. The second transfer bias at this time is determined according to the resistance detected by the resistance detection unit (not shown) that detects the resistance of the second transfer portion, and is voltage controlled.

Thereafter, the recording sheet P is sent to the press-contact portion (nip portion) of a pair of fixing rolls in the fixing device (an example of the fixing unit) 28, the toner image is fixed on the recording sheet P, and a fixed image is formed.

Examples of the recording sheet P to which the toner image is transferred include plain paper used for an electrophotographic copying machine, a printer or the like. As the recording medium, in addition to the recording sheet P, an OHP sheet or the like may be exemplified. In order to further improve the smoothness of the image surface after fixation, the surface of the recording sheet P is also preferably smooth, for example, coated paper in which the surface of plain paper is coated with resin or the like and art paper for printing are preferably used.

The recording sheet P for which the fixing of the color image is completed is transported toward an ejection portion, and the series of color image forming operations is completed.

Process Cartridge and Toner Cartridge

A process cartridge according to the exemplary embodiment will be described. The process cartridge according to the exemplary embodiment is provided with a developing unit that accommodates the electrostatic charge image developer according to the exemplary embodiment and develops an electrostatic charge image formed on a surface of an image holding member with the electrostatic charge image developer as a toner image, and is detachable from an image forming apparatus.

The process cartridge according to the exemplary embodiment is not limited to the above-described configuration, and may be configured to include a developing machine and at least one selected from other units such as an image holding member, a charging unit, an electrostatic charge image forming unit, and a transfer unit.

Hereinafter, an example of the process cartridge according to this exemplary embodiment will be described. However, the process cartridge is not limited thereto. Major parts shown in the drawing will be described, but descriptions of other parts will be omitted.

Figure 2:
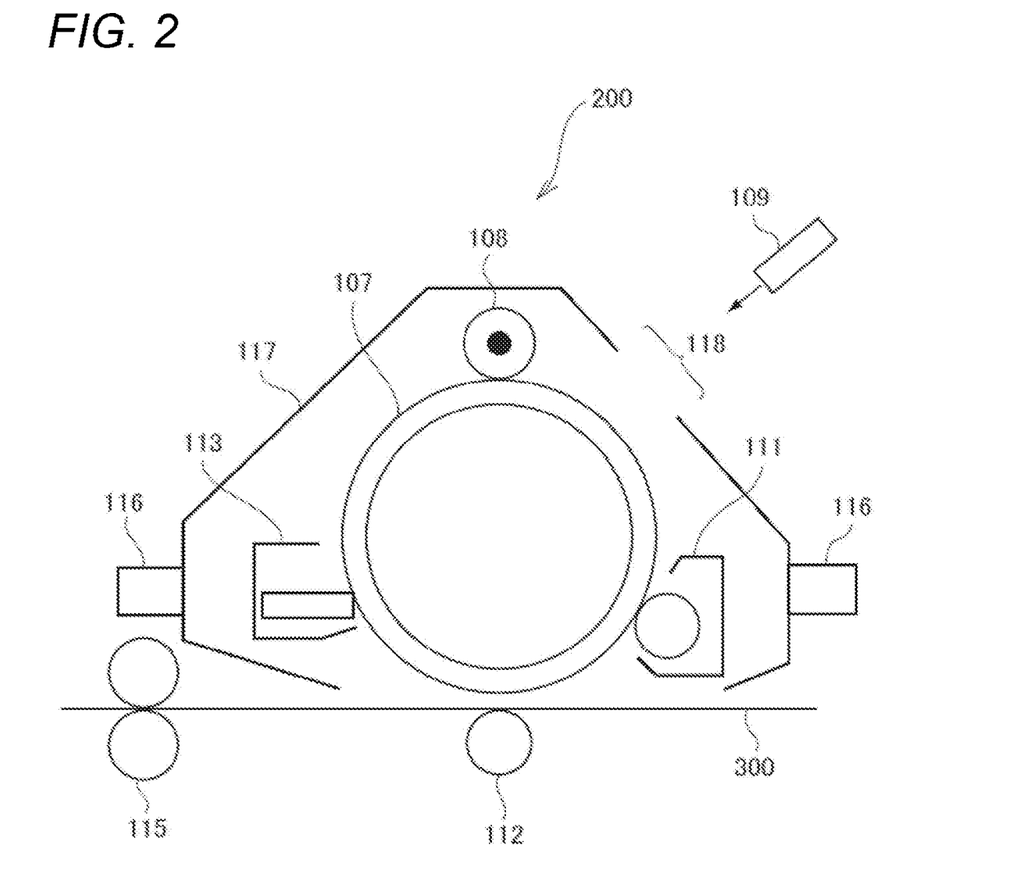
FIG. 2 is a configuration diagram illustrating an example of a process cartridge according to this exemplary embodiment.

FIG. 2 is a configuration diagram illustrating the process cartridge according to the exemplary embodiment.

The process cartridge 200 illustrated in FIG. 2 is configured such that a photosensitive body 107 (an example of the image holding member), a charging roll 108 (an example of the charging unit) which is provided in the vicinity of the photosensitive body 107, a developing machine 111 (an example of the developing unit), and a photosensitive body cleaning device 113 (an example of the cleaning unit) are integrally formed in combination, and are held by a housing 117 which is provided with an attached rail 116 and an opening portion 118 for exposing light.

Note that, in FIG. 2, reference numeral 109 is denoted as an exposure device (an example of the electrostatic charge image forming unit), reference numeral 112 is denoted as a transfer device (an example of the transfer unit), reference numeral 115 is denoted as a fixing device (an example of the fixing unit), and reference numeral 300 is denoted as a recording sheet (an example of the recording medium).

Next, the toner cartridge of the exemplary embodiment will be described.

The toner cartridge according to the exemplary embodiment accommodates the toner according to the exemplary embodiment and is detachable from an image forming apparatus. The toner cartridge contains the toner for replenishment for being supplied to the developing unit provided in the image forming apparatus.

The image forming apparatus as illustrated in FIG. 1 has such a configuration that the toner cartridges 8Y, 8M, 8C, and 8K are detachable therefrom, and the developing machines 4Y, 4M, 4C, and 4K are connected to the toner cartridges corresponding to the respective developing machines (colors) via toner supply tubes (not shown), respectively. In addition, in a case where the toner accommodated in the toner cartridge runs low, the toner cartridge is replaced.

EXAMPLES

Hereinafter, the present invention will be more specifically described by way of examples, but the present invention is not limited to the following examples as long as the gist thereof is not exceeded. In the following description, all "parts" and "%" are on a mass basis unless otherwise specified.

Preparation of Polar Group-Containing Olefin Resin
Polar group-containing olefin resin E-1 (Lotader (Registered trademark) HX8290, produced by Arkema)
Polar group-containing olefin resin E-2 (Lotader (Registered trademark) 3430, produced by Arkema)
Polar group-containing olefin resin E-3 (Lotader (Registered trademark) 3410, produced by Arkema)

Polar group-containing olefin resin E-4 (Lotader (Registered trademark) 4210, produced by Arkema)
Note that, a composition of a monomer unit, an acid value, and a melting temperature of the polar group-containing olefin resins E-1 to E-4 are indicated in Table 1.
Preparation of Polar Group-Containing Olefin Resin Particle Dispersion E-1
Toluene: 300 parts
Polar group-containing olefin resin E-1: 100 parts
The above components are mixed in a 1 L separable flask and dissolved at 90° C. with stirring. A solution prepared by dissolving 0.5 parts of sodium dodecyl benzene sulfonate and 0.5 parts of N—N dimethyl aminoethanol in 50 parts of ion-exchanged water and 50 parts of 2-propanol is added dropwise over 10 minutes. Further, while stirring at 90° C., 500 parts of ion exchanged water is added dropwise over 2 hours. Thereafter, toluene is removed using an evaporator to obtain a polar group-containing olefin resin particle dispersion E-1 having a volume average particle diameter of 140 nm. A resin particle concentration of the dispersion is adjusted to 20% with ion exchange water.
Preparation of Polar Group-Containing Olefin Resin Particle Dispersions E-2 to E-4
A polar group-containing olefin resin particle dispersion is obtained by using the same method except that the polar group-containing olefin resin E-1 is changed to the polar group-containing olefin resins E-2 to E-4 in the preparation of the polar group-containing olefin resin particle dispersion E-1.

Preparation of Other Olefin Resins
Olefin resin EV-1 (ULTRASEN (Registered trademark) 685, produced by TOSOH CORPORATION)
Olefin resin EV-2 (NUCREL N1560, produced by Du Pont-Mitsui Polychemicals Co., Ltd.)
Olefin resin EV-3 (ACLIFT (Registered trademark) WK402, produced by Sumitomo Chemical Company, Limited)
Note that, a composition of a monomer unit, an acid value, and a melting temperature in other olefin resins EV-1 to EV-3 are indicated in Table 1.
Preparation of Olefin Resin Particle Dispersions EV-1 to EV-3
An olefin resin particle dispersion is obtained by using the same method except that the polar group-containing olefin resin E-1 is changed to the olefin resins EV-1 to EV-3 in the preparation of the polar group-containing olefin resin particle dispersion E-1.

TABLE 1

|  |  | Polar group-containing olefin resin | | | | Other olefin resin | | |
|---|---|---|---|---|---|---|---|---|
|  |  | E-1 | E-2 | E-3 | E-4 | EV-1 | EV-2 | EV-3 |
| Monomer unit (X) | Ethylene | 80.2 | 82 | 79.9 | 89.9 | 86 | 85 | 75 |
| Monomer unit (Y) | Maleic anhydride | 2.8 | 3.1 | 3.1 | 3.6 |  |  |  |
|  | Methacrylic acid |  |  |  |  |  | 15 |  |
|  | Acrylic acid |  |  |  |  |  |  |  |
| Monomer unit (Z) | Acrylic acid methyl |  | 15 |  |  |  |  |  |
|  | Acrylic acid ethyl | 17 |  |  | 6.5 |  |  |  |
|  | Acrylic acid butyl |  |  | 17 |  |  |  |  |
|  | Metacrylic acid methyl |  |  |  |  |  |  | 25 |
|  | Vinyl acetate |  |  |  |  | 14 |  |  |
|  | (Unit: parts by weight) | | | | | | | |
| Resin acid value | mgKOH/g | 26 | 30 | 30 | 34 | 0 | 98 | 0 |
| Resin melting temperature | ° C. | 81 | 77 | 91 | 105 | 77 | 90 | 79 |

Synthesis of Amorphous Polyester Resin P-1 (Acid Value: 10 mgKOH/g)
Bisphenol A ethylene oxide adduct: 150 parts
Bisphenol A propylene oxide adduct: 250 parts
Terephthalic acid: 100 parts
Tetrapropenyl succinic anhydride: 130 parts
Trimellitic acid: 15 parts
The above monomer components are put into a reaction container equipped with a stirrer, a thermometer, a condenser, and a nitrogen gas inlet tube, the inside of the reaction container is substituted with dry nitrogen gas, and 0.3% of dioctanoate tin with respect to the total amount of the monomer components is added to the reaction container. The temperature is raised to 235° C. for one hour under a nitrogen gas flow, reaction is performed for 3 hours, the pressure in the reaction container is reduced to 10.0 mmHg, stirring reaction is performed, and the reaction is terminated when the required molecular weight is reached.
The glass transition temperature of the obtained amorphous polyester resin P-1 is 61° C., the weight average molecular weight is 42,000, and the acid value is 10 mgKOH/g.
Preparation of Amorphous Polyester Resin Particle Dispersion P-1
Amorphous polyester resin P-1: 100 parts Methyl ethyl ketone: 60 parts
Isopropyl alcohol: 10 parts The above components are charged into a reaction container equipped with a stirrer and dissolved at 60° C. After confirmation of dissolution, the reaction container is cooled to 35° C., and 3.5 parts of 10% aqueous ammonia solution is added. Next, 300 parts of ion exchanged water is added dropwise into the reaction container over 3 hours to produce a polyester resin particle dispersion. Subsequently, methyl ethyl ketone and isopropyl alcohol are removed by an evaporator to obtain an amorphous polyester resin particle dispersion P-1.

Preparation of Styrene Acrylic Resin Particle Dispersion P-2 (Acid Value: 10 mgKOH/g)
Styrene: 82 parts by weight
Acrylic acid n-butyl: 18 parts
Methacrylic acid: 2 parts
n-dodecyl mercaptan: 1 part The emulsion polymerization of above components is performed in a reaction kettle in which 2 parts of nonionic surfactant (NONIPOL 400 produced by Sanyo Chemical Industries. Ltd) and 3 parts of anionic surfactant (NEOGEN R produced by Dai-ichi Kogyo Seiyaku Co., Ltd.) are dissolved in 510 parts of ion exchanged water, and 50 parts of ion exchanged water in which 4 parts of ammonium persulfate is dissolved is put into the reaction kettle while stirring and mixing for 20 minutes. Thereafter, the inside of the reaction kettle is replaced with nitrogen, and the inside of the reaction kettle is heated to 70° C. and emulsion polymerization is continued for 5 hours. As a result, a styrene acrylic resin particle dispersion P-2 having a solid content of 20%, a volume average particle diameter of 201 nm, and an acid value of 10 mgKOH/g is obtained.

Preparation of Release Agent Particle Dispersion PA-1
Additive resin PA-1: Acid group-containing ethylene wax (HIWAX 1105A, produced by Mitsui Chemicals, Inc., acid value: 60 mgKOH/g): 60 parts
Anionic surfactant (NEOGEN RK produced by Dai-ichi Kogyo Seiyaku Co., Ltd.): 3 parts (60% of active ingredient, 3% of active ingredient with respect to release agent)
Ion exchanged water: 150 parts The above materials are mixed, and the release agent is dissolved at an internal solution temperature of 120° C. with a pressure discharge type homogenizer (Gorin homogenizer manufactured by Gaulin, Inc.). Thereafter, a dispersion treatment is performed on the mixture for 120 minutes at a dispersion pressure of 5 MPa, and then for 360 minutes at 40 MPa, followed by cooling to obtain a release agent dispersion. Ion exchange water is added to adjust the solid content to 20%, and the resultant is set as a release agent particle dispersion PA-1. The volume average particle diameter of the particles in the release agent particle dispersion PA-1 is 260 nm.

Preparation of Additive Resin Particle Dispersion PA-2
Additive resin PA-2: Polyhydroxy polyolefin oligomer (Polytail (registered trademark) H, produced by Mitsubishi Chemical Corporation, hydroxyl value: 50 mg KOH/g): 60 parts
Anionic surfactant (NEOGEN RK produced by Dai-ichi Kogyo Seiyaku Co., Ltd.): 3 parts (60% of active ingredient, 3% of active ingredient with respect to addictive resin)
Ion exchanged water: 150 parts The above materials are mixed, and the release agent is dissolved at an internal solution temperature of 120° C. with a pressure discharge type homogenizer (Gorin homogenizer manufactured by Gaulin, Inc.). Thereafter, a dispersion treatment is performed on the mixture for 120 minutes at a dispersion pressure of 5 MPa, and then for 360 minutes at 40 MPa, followed by cooling to obtain a release agent dispersion. Ion exchange water is added to adjust the solid content to 20%, and the resultant is set as an additive resin particle dispersion PA-2.

Preparation of Coloring Agent Particle Dispersion
Cyan pigment C.I. Pigment Blue 15: 3 (Copper Phthalocyanine, trade name: FASTOGEN BLUE LA5380, produced by DIC): 70 parts
Anionic surfactant (NEOGEN RK, produced by Daiichi Kogyo Seiyaku Co., Ltd.,): 5 parts
Ion exchanged water: 200 parts The above materials are mixed and dispersed for 10 minutes using a homogenizer (UltraTarax T50 manufactured by IKA Corporation). The ion exchanged water is added such that the solid content in the dispersion is 20%, and thereby a coloring agent particle dispersion in which coloring agent particles having a volume average particle diameter of 190 nm are dispersed is obtained.

Example 1

Preparation of Toner Particle 1

100 parts of polar group-containing olefin resin particle dispersion E-1, 14 parts of colorant particle dispersion, 8 parts of polyaluminum hydroxide (Paho2S, produced by Asada Chemical Industry Co., Ltd.), and 400 parts of ion exchange water are mixed and dispersed in a round stainless steel flask using a homogenizer (ULTRATARAX T50, manufactured by IKA Co., Ltd.) and the flask is heated to 50° C. with stirring the inside of the flask in a heating oil bath. It is confirmed that aggregated particles having a D50v of 5.5 μm are formed by holding the mixture at 50° C. Then, 1 N sodium hydroxide is added to adjust pH of the system to 8.5, and then the stainless steel flask is air-tightly sealed, heated to 85° C. with continuous stirring using a magnetic seal, and held for 2 hours. After cooling with ice water, the toner particles are separated by filtration, washed 5 times with ion exchanged water at 25° C., and then freeze-dried to obtain a toner particle 1.

Preparation of Toner 1

100 parts of toner particles 1, 0.5 parts of hydrophobic silica RX50 produced by Nippon Aerosil Co., Ltd. as an external additive, and 1.5 parts of hydrophobic silica R972 produced by Nippon Aerosil Co., Ltd. as an external additive, are blended at a circumferential velocity of 20 m/s×15 minutes using a Henschel mixer, and then coarse particles are removed using a 45 μm mesh sieve to obtain toner 1.

Preparation of Carrier

A resin solution is prepared by putting 2.5 parts of styrene-acrylic resin (styrene:methyl methacrylate=10:90, Mw: 35,000) into 45 parts of toluene. 0.2 parts of carbon black is put into the resin solution, and the mixed solution is finely dispersed for 30 minutes using a sand mill to prepare a dispersion. 25 parts of the dispersion is mixed with 100 parts of ferrite particles having a volume average particle size of 30 μm. Further, the mixture is put into a vacuum degassing type kneader, stirred for 30 minutes while heating to 80° C., and further stirred under reduced pressure to remove the solvent. After removing the solvent, the mixture is sieved with a 75 μm mesh to remove aggregates, thereby obtaining a carrier.

Preparation of Developer 1

15 parts of the obtained toner 1 and 165 parts of the obtained carrier are stirred at 20 rpm for 20 minutes using a V-blender, and sieved with a sieve having a network of 212 µm to obtain a developer 1.

Examples 2 to 13 and Comparative Examples 1 to 4

Preparation of Toner Particle and Developer

A toner particle and a developer are obtained in the same manner as in Example 1 except that a resin particle dispersion to be used and the amount thereof are changed from 100 parts of the polar group-containing olefin resin particle dispersion E-1 to a resin particle dispersion to be used and the amount thereof indicated in Table 2 in the preparation of toner particle 1 of Example 1.

Example 14

Preparation of Toner Particle

A toner particle is produced by a kneading and pulverizing method.

35 parts of polar group-containing olefin resin E-1, 65 parts of amorphous polyester resin P-1, and 14 parts of cyan pigment C.I. Pigment Blue 15: 3 (Copper phthalocyanine, trade name: FASTOGEN BLUE LA5380, produced by DIC) are put into a Banbury mixer (manufactured by Kobe Steel, Ltd.), and a pressure is applied so that the internal temperature is 110±5° C., and kneading is performed at 80 rpm for 10 minutes. The obtained kneaded product is cooled, substantially crushed by a hammer mill, further finely pulverized by a jet mill, and then classified by an elbow jet classifier (manufactured by MATSUBO Corporation). A dispersion is prepared by dispersing 100 parts of the particles in an aqueous solution prepared by adding 6.8 parts of sodium dodecylbenzene sulfonate to 550 parts of ion exchanged water. A solution in which 0.34 parts of ammonium persulfate is dissolved in 10 parts of ion-exchanged water is added into the obtained dispersion, a mixed solution in which 12.3 parts of styrene is mixed with 34 parts of ion-exchanged water at a temperature of 80° C. and 2 parts of sodium dodecylbenzene sulfonate is further mixed is added dropwise over 30 minutes, and the resultant is polymerized at 80° C. for 2 hours.

The reaction product is filtered, washed with ion exchanged water, and dried using a vacuum dryer to obtain a toner particle. Further, a developer is obtained in the same manner as in Example 1 except that the toner particle is used.

Regarding each toner of Examples and Comparative Examples, the acid value and the proportion (hereafter, referred to as "maleic acid derived carboxy group ratio") of the carboxy group contained in a maleic acid group and a maleic anhydride group with respect to the total carboxyl group contained in the toner are measured by the above method. The results are indicated in Table 2.

Evaluation

Evaluation of High Temperature Offset

An unfixed image is output by adjusting a toner application amount to 4.5 g/m² by DocuCentre Color 400 manufactured by Fuji Xerox Co., Ltd. Film synthetic paper (Yupo Paper, manufactured by Yupo Corporation) is used as a recording medium. The output image is a solid image of 50 mm×50 mm and 100% image density.

As a fixing evaluation apparatus, an apparatus which is modified by removing a fixing machine of Apeos Port IV C3370 manufactured by Fuji Xerox Co., Ltd. so that a fixing temperature can be changed is used.

The fixing evaluation apparatus has a nip width of 6 mm, a nip thickness of 1.6 kgf/cm², and a process speed of 175 mm/sec. The unfixed image is fixed at intervals of 5° C. in a fixing temperature range of 160° C. to 220° C., the presence or absence of hot offset is visually confirmed, and the lowest temperature at which the hot offset occurred is evaluated as the hot offset occurrence temperature. Evaluation criteria are as follows.

A: Hot offset occurrence temperature is 220° C. or higher

B: Hot offset occurrence temperature is 200° C. or higher and less than 220° C.

C: Hot offset occurrence temperature is 180° C. or higher and less than 200° C.

D: Hot offset occurrence temperature is less than 180° C.

Evaluation of Low Temperature Offset

An unfixed image is output by adjusting a toner application amount to 4.5 g/m² by DocuCentre Color 400 manufactured by Fuji Xerox Co., Ltd. Film synthetic paper (Yupo Paper, manufactured by Yupo Corporation) is used as a recording medium. The output image is a solid image of 50 mm×50 mm and 100% image density.

As a fixing evaluation apparatus, an apparatus which is modified by removing a fixing machine of Apeos Port IV C3370 manufactured by Fuji Xerox Co., Ltd. so that a fixing temperature can be changed is used. The fixing evaluation apparatus has a nip width of 6 mm, a nip thickness of 1.6 kgf/cm², and a process speed of 175 mm/sec.

The unfixed image is fixed at intervals of 5° C. in a fixing temperature range of 140° C. to 170° C., the presence or absence of cold offset is visually confirmed, and the lowest temperature at which the cold offset occurred is evaluated as the cold offset occurrence temperature. Evaluation criteria are as follows.

A: Cold offset occurrence temperature is 140° C. or less

B: Cold offset occurrence temperature is higher than 140° C. and 150° C. or lower C: Cold offset occurrence temperature is higher than 150° C. and 160° C. or lower D: Cold offset occurrence temperature is 170° C. or lower Evaluation of Bending Resistance (Bending Strength)

An unfixed image is output by adjusting a toner application amount to 13.5 g/m² by DocuCentre Color 400 manufactured by Fuji Xerox Co., Ltd. Film synthetic paper (Yupo Paper, manufactured by Yupo Corporation) is used as a recording medium. The output image is a solid image of 25 mm×25 mm and 100% image density.

As a fixing evaluation apparatus, an apparatus which is modified by removing a fixing machine of Apeos Port IV C3370 manufactured by Fuji Xerox Co., Ltd. so that a fixing temperature can be changed is used.

The fixing evaluation apparatus has a nip width of 6 mm, a nip thickness of 1.6 kgf/cm², and a process speed of 175 mm/sec.

An unfixed image is fixed at intervals of 5° C. from a fixing temperature of 90° C. to 180° C., a good fixed image free from image defects and image disorder due to peeling defects is bent, a 50 g load is applied thereto, and the degree of image defects in that part is observed. Then, when the fixing temperature, which is equal to or higher than a level at which some image peeling is observed but there is no problem in practical use, is evaluated as the minimum fixing temperature.

A: Minimum fixing temperature is lower than 130° C.

B: Minimum fixing temperature is 130° C. or higher and lower than 140° C.

C: Minimum fixing temperature is 140° C. or higher and lower than 150° C.

D: Minimum fixing temperature is 150° C. or higher

Evaluation of High Temperature and High Humidity Image Defect

After leaving DocuCentre Color 400 manufactured by Fuji Xerox Co., Ltd for one day in a low temperature and low humidity environment (10° C., 15% RH), 100,000 images of area coverage 1% are output consecutively. Then, the image forming apparatus is left for one day in a high temperature and high humidity environment (30° C., 85% RH). Subsequently, 20,000 images of area coverage 20% are output consecutively. A total of 100 final images are checked for 20,000 consecutive images with an area coverage of 20%, and the number of the sheets on which image defects (such as color streaks and color loss) occurred is counted.

A: Number of sheets on which image defects occurred ≤1

B: 1<Number of sheets on which image defects occurred ≤5

C: 5<Number of sheets on which image defects occurred ≤10

D: 10<Number of sheets on which image defects occurred ≤20

E: 20<Number of sheets on which image defects occurred

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

TABLE 2

|  |  |  | Example | | | | | | | | | |
|---|---|---|---|---|---|---|---|---|---|---|---|---|
|  |  |  | 1 | 2 | 3 | 4 | 5 | 6 | 7 | 8 | 9 | 10 |
| Resin | Resins 1 |  | E-1 | E-1 | E-1 | E-2 | E-3 | E-4 | E-1 | E-1 | E-1 | E-1 |
|  | Resins 2 |  |  | P-1 | P-1 | P-1 | P-1 | P-1 | P-2 | EV-1 | EV-2 | EV-3 |
|  | Resins 3 |  |  |  |  |  |  |  |  |  |  |  |
|  | Resins 4 |  |  |  |  |  |  |  |  |  |  |  |
|  | Content of Resins 1 |  | 100 | 65 | 35 | 35 | 35 | 35 | 35 | 55 | 35 | 55 |
|  | Content of Resins 2 |  |  | 35 | 65 | 65 | 65 | 65 | 65 | 45 | 65 | 45 |
|  | Content of Resins 3 |  |  |  |  |  |  |  |  |  |  |  |
|  | Content of Resins 4 |  |  |  |  |  |  |  |  |  |  |  |
| Toner acid value |  | mgKOH/g | 20.8 | 16.3 | 12.5 | 13.6 | 13.6 | 14.7 | 12.5 | 11.4 | 58.2 | 11.4 |
| Olefin resin melting temperature |  | ° C. | 81 | 81 | 81 | 77 | 91 | 105 | 81 | 81 | 81 | 81 |
| Maleic acid derived carboxy group ratio |  | % | 100 | 83 | 58 | 62 | 62 | 65 | 58 | 100 | 13 | 100 |
| Evaluation | Yupo paper | High temperature offset | B | B | B | B | B | A | B | C | A | B |
|  | fixability | Low temperature offset | A | B | B | B | B | C | B | B | B | B |
|  |  | Bending strength | A | B | B | B | B | B | B | C | B | C |
|  | Image defects at high temperature and high humidity |  | B | B | B | B | B | A | A | A | C | B |
| Others |  |  |  |  |  |  |  |  |  |  |  |  |

|  |  |  | Example | | | | Comparative Example | | | |
|---|---|---|---|---|---|---|---|---|---|---|
|  |  |  | 11 | 12 | 13 | 14 | 1 | 2 | 3 | 4 |
| Resin | Resins 1 |  | E-1 | E-1 | E-1 | E-1 | E-1 | E-1 | EV-3 | EV-2 |
|  | Resins 2 |  | P-1 | P-1 | P-1 | P-1 | EV-1 | EV-2 | P-1 | P-1 |
|  | Resins 3 |  | PA-1 | PA-2 | PA-1 |  | P-1 |  | PA-1 |  |
|  | Resins 4 |  |  |  | PA-2 |  |  |  |  |  |
|  | Content of Resins 1 |  | 40 | 40 | 40 | 35 | 35 | 20 | 35 | 35 |
|  | Content of Resins 2 |  | 50 | 50 | 50 | 65 | 45 | 80 | 50 | 65 |
|  | Content of Resins 3 |  | 10 | 10 | 5 |  | 20 |  | 15 |  |
|  | Content of Resins 4 |  |  |  | 5 |  |  |  |  |  |
| Toner acid value |  | mgKOH/g | 17.1 | 12.3 | 14.7 | 12.5 | 8.9 | 66.9 | 11.2 | 32.6 |
| Olefin resin melting temperature |  | ° C. | 81 | 81 | 81 | 81 | 81 | 81 | 79 | 90 |
| Maleic acid derived carboxy group ratio |  | % | 77 | 68 | 73 | 58 | 82 | 6 | 64 | 0 |
| Evaluation | Yupo paper | High temperature offset | C | C | C | C | D | C | D | B |
|  | fixability | Low temperature offset | A | B | B | B | B | B | C | D |
|  |  | Bending strength | B | B | B | B | D | B | D | D |
|  | Image defects at high temperature and high humidity |  | C | B | B | A | B | E | D | C |
| Others |  |  |  |  |  | Kneading method |  |  |  |  |

What is claimed is:

1. An electrostatic charge image developing toner comprising:
a polar group-containing olefin resin that is a polymer of a composition containing at least one nonpolar monomer unit (X) selected from the group consisting of ethylene and α-olefin having 3 to 10 carbon atoms, a polar monomer unit (Y) having at least one of a maleic acid group and a maleic anhydride group, and a monomer unit (Z) having a polymerizability to at least one of the nonpolar monomer unit (X) and the polar monomer unit (Y),
wherein an acid value of the toner is 10 mgKOH/g to 60 mgKOH/g, and
wherein a proportion of the polar group-containing olefin resin is 35% by weight to 100% by weight with respect to a total mass of resin components contained in the toner.

2. The electrostatic charge image developing toner according to claim 1, wherein the polar group-containing olefin resin is a polymer of a composition containing at least one selected from the group consisting of ethylene and α-olefin having 3 to 6 carbon atoms as the nonpolar monomer unit (X).

3. The electrostatic charge image developing toner according to claim 1,
wherein the polar group-containing olefin resin is a polymer of a composition in which a proportion of the polar monomer unit (Y) is 1% by weight to 20% by weight with respect to total monomer units of the polymer.

4. The electrostatic charge image developing toner according to claim 1,
wherein the polar group-containing olefin resin is a polymer of a composition containing an acrylic ester represented by Formula (Z1) as the monomer unit (Z), $H_2C=C(R^{Z1})-COO-R^{Z2}$    Formula (Z1)

wherein $R^{Z1}$ represents a methyl group or an ethyl group, and $R^{Z2}$ represents an alkyl group having 1 to 6 carbon atoms.

5. The electrostatic charge image developing toner according to claim 1 further comprising a polyester resin.

6. The electrostatic charge image developing toner according to claim 1,
wherein a melting temperature of the polar group-containing olefin resin is 65° C. to 95° C.

7. The electrostatic charge image developing toner according to claim 1,
wherein among entire carboxy groups contained in the electrostatic charge image developing toner, a proportion of a carboxy group contained in the maleic acid group and the maleic anhydride group is 10% to 100%.

8. An electrostatic charge image developer comprising the electrostatic charge image developing toner according to claim 1.

9. A toner cartridge configured to accommodate the electrostatic charge image developing toner according to claim 1,
wherein the toner cartridge is detachable from an image forming apparatus.

* * * * *